3,050,141
EMULSION DRILLING FLUID AND METHOD
James L. Lummus and Theodore T. Martin, Tulsa, Okla., assignors to Pan American Petroleum Corporation, Tulsa, Okla., a corporation of Delaware
No Drawing. Filed Dec. 11, 1958, Ser. No. 779,524
6 Claims. (Cl. 175—41)

This invention relates to an improved drilling fluid composition and method of sampling reservoir rocks. More particularly, this invention relates to an improved emulsion for use as a drilling fluid in drilling oil wells and to a method of utilizing this emulsion to produce a filter cake on the well walls and to obtain samples of the reservoir rocks drilled with sufficient residual oil therein for a determination of the presence of petroleum in the reservoir.

Aqueous muds, i.e., water containing clay and other water-dispersible and water-soluble additives, have been used for a long time to drill oil wells. Such muds have physical properties such as lubricity and viscosity which permit them to remove the cuttings, lubricate the bit and the drill pipe, etc. It has been found in recent years, however, that some of these properties, particularly lubricity, can be improved by dispersing a small quantity of hydrocarbon liquids, such as diesel oil, in these aqueous drilling fluids. By thus improving the lubricity of the drilling fluid, the friction of the drill pipe as it is rotated in the open hole and in the cased hole is reduced and, therefore, the wear on the drill pipe and the casing is reduced. The power required to drive or rotate the drill pipe is similarly reduced. The presence of this second liquid phase dispersed in the aqueous drilling fluid has been found to produce still another advantage; namely, a reduction in the filtrate rate of the drilling fluid. That is, with the finely dispersed droplets of oil in the mud, it appears that the loss of water from the drilling fluid to the surrounding permeable rocks is substantially reduced. These emulsions of oil in aqueous drilling fluids have been found to possess one serious disadvantage, however. Being miscible with crude oils or petroleum, which terms as used herein are intended to include distillates found in substerranean reservoirs, filtration or loss of these extraneous hydrocarbons into the rock ahead of the drill bit obviously displaces the indigenous hydrocarbons, i.e., the connate oil in the rock, out of the rock being drilled. For this reason an oil-producing horizon is often overlooked and bypassed as drilling proceeds, particularly where an analysis of the bit cuttings is relied upon to indicate the presence of a producing reservoir.

It is, therefore, an object of this invention to provide an improved drilling fluid emulsion. It is a more specific object of this invention to provide an improved emulsion mud and a method of sampling a reservoir by cuttings analysis wherein the cuttings are obtained by drilling with the improved emulsion mud which method retains the advantages but does not have the main disadvantage of sampling using previous drilling fluid emulsions. It is still a more specific object of this invention to provide an emulsion of a crude oil-immiscible liquid in an aqueous mud for producing bit cuttings which have a residue of connate crude oil when they are separated from the drilling fluid at the surface and, upon ultraviolet irradiation, fluoresce like the crude oil rather than like the refined hydrocarbons typically used in emulsion muds. Other objects of this invention will become apparent from the following description.

This invention may be described briefly as an aqueous drilling fluid emulsion in which the disperse phase is an essentially oil- and water-insoluble and immiscible liquid and as a method utilizing such an emulsion to obtain from petroleum-producing reservoirs drill bit cuttings having sufficient residuum of the petroleum hydrocarbons to produce a positive test for such hydrocarbons, particularly a luminescence characteristic of the petroleum upon irradiation of the cleaned cuttings with ultraviolet light.

The basic liquid, namely, the aqueous mud, may comprise a major proportion, typically 75 to 95%, of water or water containing water-dispersible solids such as bentonite or other colloids and various other additives such as clay peptizing agents for improving the properties of that aqueous phase. The internal or disperse phase of the drilling fluid emulsion comprises an oil- and water-insoluble and immiscible liquid, hereinafter often referred to as an "amphiphobic" liquid. For the purpose of this description and the appended claims an amphiphobic liquid is defined as a liquid which is incompatible, i.e., is essentially insoluble in and immiscible with, both oil and water. It forms a third layer in the presence of oil and water. This amphiphobic liquid, furthermore, may be distinguished by a positive test, such as fluorescence, from the petroleum hydrocarbons encountered in the formations penetrated by a drill. Specifically, this amphiphobic liquid should not fluoresce under ultraviolet irradiation or if it does fluoresce, it fluoresces a different color from typical unrefined hydrocarbons or crude oils as they are found in nature. An example of these amphiphobic liquids is furfural. As shown in Table I which follows, this amphiphobic liquid reduces to some extent the filtrate rate or fluid loss of the aqueous drilling fluid in a standard API filtrate rate test. While not shown in the table, the disperse phase is particularly effective in reducing the filtration or fluid loss when the emulsion is displaced through a rock core. In these tests the amphiphobic liquid used was furfural and the mud was a neat 5% bentonite and water mud. Furthermore, as also shown in Table I, this emulsion reduces the friction between steel and steel, i.e., between the drill pipe and the surrounding casing. It also reduces the friction between steel and rock, i.e., the friction between the drill pipe and the well wall.

Table I

| Amphiphobic Liquid, Percent | Neat Mud, Percent | Friction | | Fluid Loss, 30 min. API | Remarks |
|---|---|---|---|---|---|
| | | Dial | Percent Reduction | | |
| -------- | 100.0 | 75 | -------- | 13.5 | |
| 1.0 | 99.0 | 70 | 7 | 13.2 | Foam. |
| 2.0 | 98.0 | 65 | 13 | 13.3 | Do. |
| 4.0 | 96.0 | 65 | 13 | 13.0 | Do. |
| 6.0 | 94.0 | 60 | 20 | 13.0 | Slight Foam. |
| 8.0 | 92.0 | 55 | 27 | 13.0 | No Foam. |
| 10.0 | 90.0 | 60 | 20 | 12.2 | Do. |

In the foregoing tests the friction was obtained by mounting a cup, partially filled with the mud sample, for rotation on an inclined axis. Rotation was counteracted by a torsion spring. A steel cylinder rotating on a vertical axis was held in contact at uniform pressure with the bottom of the cup at a point off center of both the cylinder and the cup and under the liquid level of the emulsion in the cup. Rotation of the cup against the force of the spring was thus proportional to the friction between the cup and the cylinder and was indicated on an arbitrary scale around the periphery of the cup. From these data it can be seen that at low concentrations, i.e., concentrations below the solubility limit of the amphiphobic liquid in the aqueous drilling fluid, the mixture tends to foam but that at concentrations above about 6% of furfural in the aqueous mud, the furfural reduces both the friction and fluid loss of the mud.

In operation, the amphiphobic liquid is added to the aqueous mud, as by passing the constituents through a pump together, in a concentration great enough to produce an emulsion having the amphiphobic liquid as the internal or disperse phase. Due to the cost of the amphiphobic liquid, an amount greater than that required to produce a disperse phase is generally not desirable. The amount of amphiphobic liquid thus added is, therefore, typically only slightly more than the maximum solubility or solubility limit of the amphiphobic liquid in water. In the case of furfural, for example, the concentration of the amphiphobic liquid should be greater than about 6%, typically about 8 to 10%, or more. The solubility and therefore the minimum concentration of furfural or any other amphiphobic liquid in water or other aqueous liquids can be determined by reference to a solubility table or preferably by trial wherein sufficient amphiphobic liquid is added to the immiscible liquid to produce a disperse phase in the immiscible liquid.

Generally, depending upon the mixing procedure and the viscosity of the base liquid, the amphiphobic liquid will remain dispersed in the base or outer phase without the use of a stabilizing agent. In some cases, however, it has been found desirable to add a small amount of a stabilizing agent, such as Albasol BF, a potassium soap solubilized with glycol which is manufactured by and available from Nopco Chemical Company, Harrision, New Jersey, or Sterox CD, a tall oil ester having 12 ethylene oxide mols per mol of tall oil, which is manufactured by and available from Monsanto Chemical Company, St. Louis, Missouri. A concentration in the range of about 0.05% to about 1% or more, typically about 0.1%, by volume of any of these emulsion stabilizing agents not only stabilizes the emulsion but appears to further reduce the friction between steel and steel and between steel and rock. In any case the composition is circulated in a well in the same manner as emulsions and other fluids used in drilling wells.

A particularly important feature of this invention, as indicated previously, is in the use of the above-described emulsion for obtaining cuttings including cores from petroleum-producing reservoirs without destroying the fluorescence of those cuttings produced by the connate oil in the reservoir. As an example of the effect of an amphiphobic liquid, in this case furfural, on the fluorescence of cuttings, a quantity of oil-free sandstone cuttings was agitated for 18 hours in contact with 6 volume percent emulsions of each diesel oil, crude oil, and furfural in water. Those cuttings contacted with the diesel oil emulsion when irradiated with ultraviolet light fluoresced blue; those which had been exposed to the crude oil emulsion when irradiated with ultraviolet light fluoresced yellow; but oil-free cuttings which had been agitated in contact with the furfural emulsion showed no trace of fluorescence when irradiated with ultraviolet light. Next, clean cuttings of the same type were saturated with crude oil and equal quantities of these oil saturated cuttings were agitated for a period of 18 hours in a beaker containing 6 volume percent emulsions of each diesel oil and furfural in water. At the end of this period each group of the cuttings was taken from the breaker, washed with water, and irradiated with ultraviolet light. The cuttings flushed with the furfural emulsion still fluoresced yellow, a positive test for the presence of residual crude oil in or on the cuttings, but the cuttings which had been flushed with the diesel oil emulsion fluoresced blue, indicating that all of the unrefined hydrocarbon initially in the cuttings or at least on the surface of the cuttings had been displaced by or dissolved in the diesel oil or that the fluorescence of the cuttings had been masked by the fluorescence of the diesel oil.

The reason for this difference is not exactly known but it is postulated that since crude oil is substantially insoluble in and immiscible with furfural, the furfural emulsion did not dissolve or displace all the crude oil from the cuttings. Therefore, the cuttings which were initially wetted by the crude oil retained a film of oil on the surface and remained fluorescent even though a small part of the crude oil might have been dissolved by or otherwise displaced from the cuttings with the amphiphobic liquid in the mud. The crude oil on the other hand being soluble in and miscible with the diesel oil in the diesel oil-aqueous liquid emulsion and the diesel oil itself producing fluorescence, crude oil was removed from those cuttings either by solution in the diesel oil phase of the emulsion or by miscible fluid displacement therefrom with the diesel oil in an amount sufficient to overcome the natural fluorescence of crude oil which is typically yellow and in some cases blue. The natural fluorescence might have been overcome either due to masking of the natural fluorescence by the blue fluorescence of the diesel oil or due to the absence of sufficient residual crude oil in or on the cuttings to produce detectable natural fluorescence.

In our preferred drilling process before the producing horizon is reached by the drill, the amphiphobic liquid is emulsified in the aqueous drilling fluid by any of various means. This emulsion is then circulated through the well by use of the ordinary mud pumps. The bit cuttings are separated from the returning stream, washed clean with water or other oil immiscible solvent, and continuously analyzed for fluorescence or some other parameter indicative of the presence of crude oil and penetration of the oil-producing formation. By circulating our improved emulsion, the fluorescence of the cuttings produced by the crude oil is not only retained but the returning stream of emulsion often contains sufficient cuttings and/or free crude oil for visual or automatic fluorescent analysis and continuous logging of fluorescence of the stream to indicate penetration of the bit into an oil-producing formation.

From the foregoing description it can be seen that this invention is susceptible of a wide variety of embodiments and that this invention should, therefore, be construed not to be limited by the above description but should be construed to be limited only by the scope of the appended claims.

We claim:

1. A method of sampling a subterranean formation comprising drilling a hole into said subterranean formation to produce formation cuttings, circulating furfural aqueous mud emulsion in said hole during drilling to circulate said cuttings to the surface, said emulsion containing at least about 6 percent by volume of furfural dispersed in the aqueous phase and irradiating said cuttings with ultraviolet light whereby said cuttings may be analyzed for fluorescence to determine the presence of crude oil in said formation.

2. A method of sampling the fluids in a subterranean formation comprising drilling a hole into said formation, circulating a furfural aqueous mud emulsion in said hole during drilling to circulate a sample of said fluids to the surface, said emulsion containing at least about 6 percent by volume of furfural dispersed in the aqueous phase and irradiating said sample with ultraviolet light whereby said sample may be analyzed for fluorescence to determine the presence of crude oil in said formation.

3. A method of sampling a subterranean formation to determine the presence of crude oil therein comprising drilling a hole into said formation, circulating in said hole during drilling a furfural aqueous mud emulsion to circulate a sample of said formation to the surface, said emulsion containing at least about 6 percent by volume of furfural dispersed in the aqueous phase washing said sample in a clean aqueous liquid to remove said emulsion, irradiating said sample with ultraviolet light, and then determining the presence of yellow fluorescence of said cuttings under said fluorescent irradiation as an indication of the presence of crude oil in said formation.

4. In a process for drilling a well with well drilling tools wherein there is circulated in the well a water base drilling mud containing collodial particles of clayey material suspended in sufficient water to render the same circulatable, the method of forming a filter cake on the wall of said well to decrease the loss of fluid from said drilling mud contained therein into surrounding earthen formations which comprises dispersing at least about 6 percent by volume of furfural in said drilling mud whereby an improved non-fluorescent filter cake is deposited on the wall of said well.

5. A composition of matter suitable for use as a drilling fluid comprising furfural, clay and water, said furfural and clay being dispersed in said water and the concentration of said furfural being greater than about 6 percent by volume of said water.

6. A composition according to claim 5 including sufficient emulsifying agent to stabilize the dispersion of furfural in the water dispersion of clay.

References Cited in the file of this patent

UNITED STATES PATENTS

| | | |
|---|---|---|
| 2,206,922 | Smith | July 9, 1940 |
| 2,307,843 | Mathis et al. | Jan. 12, 1943 |
| 2,698,833 | Wilson | Jan. 4, 1955 |
| 2,740,758 | Cross et al. | Apr. 3, 1956 |